March 15, 1960 E. BELLMANN 2,928,643
PROP-TYPE SUPPORTING DEVICE
Filed Feb. 9, 1954 2 Sheets-Sheet 1
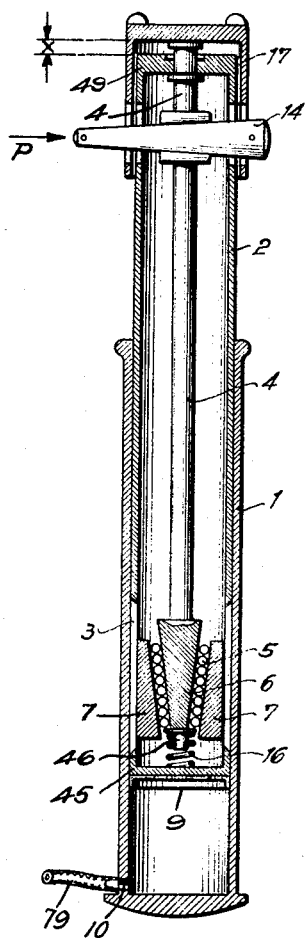
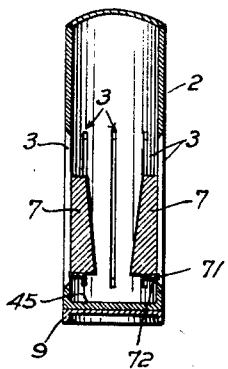
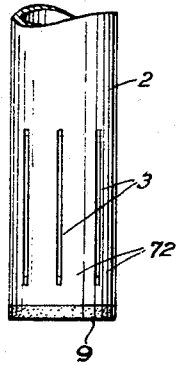
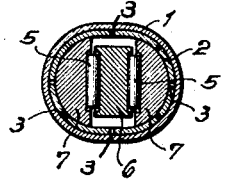
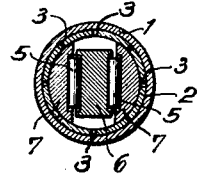
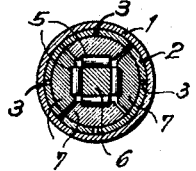
INVENTOR March 15, 1960  E. BELLMANN  2,928,643
PROP-TYPE SUPPORTING DEVICE
Filed Feb. 9, 1954
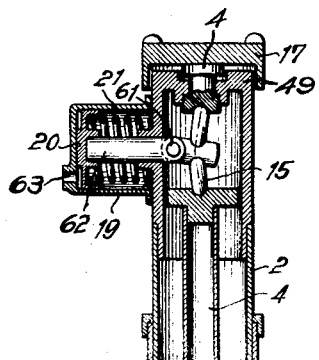
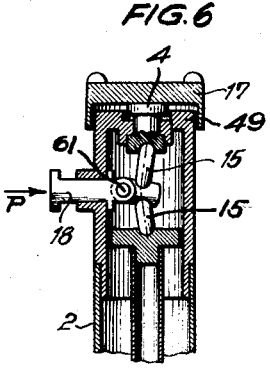
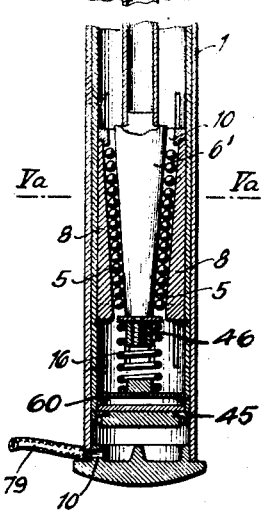
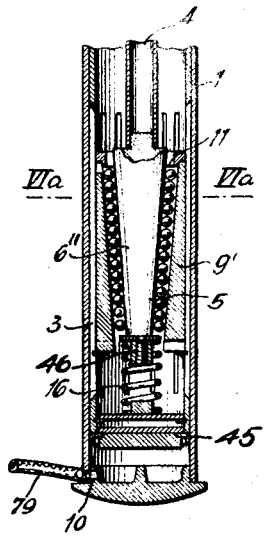
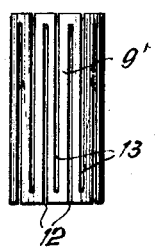
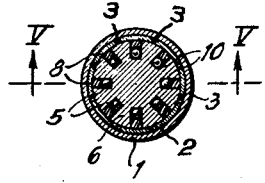
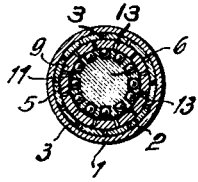

United States Patent Office 2,928,643
Patented Mar. 15, 1960

2,928,643

PROP-TYPE SUPPORTING DEVICE

Eugen Bellmann, Hagen-Haspe, Germany

Application February 9, 1954, Serial No. 409,167

Claims priority, application Germany February 21, 1953

4 Claims. (Cl. 248—354)

This invention relates to prop-type supporting devices, and more particularly to shoring supports as used in mine service.

This application is a continuation in part of my co-pending patent application Ser. No. 401,941, filed Jan. 4, 1954 for Prop-type Supporting Devices.

Prop-type supporting devices comprise a pair of relatively movable columns which must be firmly held in position when the device is supporting a load; these columns must be adapted to be readily telescoped axially outwardly when the supporting device is being installed, and adapted to be readily telescoped axially inwardly when the supporting device is being removed from any particular point where it had been in service.

It is, therefore, one object of this invention to provide a prop-type supporting device requiring a minimum of effort and a minimum of time for the installation and removal thereof.

Another object of the invention is to provide a prop-type supporting device having means in the nature of a friction brake to preclude relative movement of the two relatively movable columns thereof and having anti-friction means for facilitating operation of the means in the nature of a friction brake.

Another object of the invention is to provide a prop-type supporting device having means in the nature of a friction brake to preclude relative movement of the two constituent relatively movable columns thereof, and having automatic means for tightening the brake mechanism upon movement of the columns to the load-bearing position thereof, and further having manually operable means adapted to effect virtually instant collapse of the brake action of said means in the nature of a friction brake.

With these and other objects in view the invention comprises the novel combination and arrangement of parts, and manners of effecting the same, hereinafter fully described, illustrated in the accompanying drawings and particularly pointed out in the appended claims, it being understood that the invention is not to be limited to the specific embodiments shown and described but that many variations and modifications thereof are possible, within the scope of the claims, without departing from the spirit of the invention or sacrificing any of the advantages thereof.

In the drawings:

Fig. 1 is generally an axial section of a supporting device embodying the invention, some of the parts thereof, however, being shown in front elevation rather than in section;

Figs. 1a and 1b are details of the structure of Fig. 1;

Figs. 2 to 4, inclusive, are cross-sections through the lower portion of the device shown in Fig. 1 and indicate three possible modifications or variations of the basic geometry of the device;

Fig. 5 illustrates in the same way as Fig. 1 another supporting device embodying the invention;

Fig. 5a is a cross-section along Va—Va of Fig. 5;

Fig. 5b shows the lower portion of the structure of Fig. 5, some of the parts of the structure having been removed therefrom;

Fig. 6 illustrates in the same way as Figs. 1 and 5 another supporting device embodying the invention;

Fig. 6a is a cross-section along VIa—VIa of Fig. 6;

Fig. 6b shows the lower portion of the structure of Fig. 6, some of the parts of the structure having been removed therefrom; and Fig. 7 is a front elevation of a constituent element of the structure of Figs. 6 and 6a.

Referring now to Fig. 1, reference numerals 1 and 2 indicate a pair of coaxially arranged substantially hollow supporting columns. The upper column 2 is inserted into the lower column 1 and slidably arranged therein in a direction longitudinally of both columns 1 and 2. The lower end of column 2 is closed by a piston structure 45 to enable column 2 to be moved within column 1 under the action of fluid under pressure introduced into column 1. A cup-gasket or sleeve 9 is attached to piston structure 45 to preclude fluid under pressure from escaping from the space in front of piston structure 45 to the back thereof. Column 1 is provided with an orifice 10 for the admission of a fluid under pressure. Either a liquid under pressure or a gas under pressure may be used to operate the device. In other words, the device may be operated hydraulically, if desired, or pneumatically, if the latter mode of operation appears to be more appropriate or desirable under the circumstances. The inner surface of column 2 supports radially outer wedge members 7 which may be considered a multiple wedge member. The radially inner wedge member or ram 6 is arranged within, and coaxially with respect to column 2. A plurality of friction-reducing rollers 5 are arranged between the surfaces of parts 6 and 7. Wedge member 6 has a projection 46 surrounded by a helical spring 16 which rests against piston structure 45 and biases member 6 in upward direction. Column 2 is provided with lateral slots 3 which permit column 2 to expand radially outwardly when acted upon by outer wedge member 7 when spread apart by inner wedge member 6. If engagement of members 6, 7 and columns 2, 1 is effected under sufficient pressure, further relative movement of columns 1 and 2 in a direction longitudinally thereof is precluded. Thus members 6, 7 and the parts associated with them may be caused to operate as an effective friction brake for holding column 2 in any desired position against the action of considerable external forces. Abutment rod 4 is arranged coaxially with respect to columns 1 and 2 and consists of two parts of which the lower part is integrated with member 6 into one structural unit. The upper part of abutment rod 4 is slidably arranged within the top 49 of column 2. A wedge 14 is arranged between the juxtaposed spaced ends of abutment rod 4. Wedge 14 is normally in place and then forms a rigid interconnection or coupling between the lower portion and the upper portion of rod or rod member 4. When wedge 14 is being removed from the structure, e.g. by means of a hammer acting upon it in the direction of the arrow P, the wedge action of parts 6, 7 and concomitantly the friction between columns 2, 1 collapses instantly and column 2 is allowed to slide down under the action of gravity into column 1. The upper portion of abutment rod 4 supports a cap 17 adapted to receive the top end 49 of column 2. Prior to installation of the supporting device there is a predetermined clearance X between the top end 49 of column 2 and the inner surface of cap 17.

In all elevational figures of the drawings only two of the slots 3 have been shown (Figs. 1, 5 and 6). This has been done for the sake of clarity. The number of slots 3 is actually larger, as clearly shown in Figs. 2, 3, 4, 5a and 6a. Fig. 1a shows the lower portion of column 2 in a vertical section upon removal of parts 4, 5 and 6 therefrom, thus exposing to view some of the slots 3 which have been omitted, or are not visible in Fig. 1. The hatched sections 7 in Fig. 1a suggest the normal location of members 7 not fully shown in Fig. 1a. Fig. 1b shows the lower portion of column 2 in front elevation and the slots 3 situated on the front of column 2.

Referring now more particularly to Figs. 1a and 1b, column 2 is shown as being closed at the bottom thereof by a plate 45, thus adapting column 2 to function as a piston. Cup-gasket 9 is attached to plate 45. Numeral 72 has been applied to indicate the portions or segments of column 2 formed between slots 3. Parts 7 may be attached in any desired way to column portions 72. If desired, each may be provided with a small bracket 71 supporting one of parts 7. Brackets 71 are not essential since parts 7 may be screwed directly against column portions 72.

To operate the supporting device shown in Fig. 1 the two columns 1, 2 are held in vertical position while fluid under pressure is being admitted to orifice 10 acting upon piston structure 45 and raising column 2. This causes the upper surface of cap 17 to engage the ceiling or equivalent structure to be supported by the supporting device. Continued action of fluid pressure upon piston structure 45 causes upward movement of column 2 and compression of helical spring 16. Continued raising of column 2 after engagement of a ceiling structure by cap 17 causes relative movement of parts 7 and 6 and reduction of clearance X. Thus the radially inner member 6 is wedged into the radially outer member 7 by the action of the force of reaction to the force acting upon piston structure 45. Said force of reaction is being transmitted to member 6 through the upper and the lower portion of abutment rod 4 and through wedge 14. The force transmitted to member 6 through rod 4 is equal, but opposite, to the force which the fluid in front of piston structure 45 exerts upon said piston structure. The transverse clamping pressure between the radially outer clamping member 7, the outer surface of column 2 and the inner surface of column 1 increases as the driving force upon piston structure 45 increases and as the clerance X between parts 17 and 49 decreases. When this clearance is about to become zero sufficient transverse pressure may be exerted by parts 6, 7, 2 upon the inside of column 1 to frictionally maintain columns 1 and 2 in position against the action of the weight resting upon the top end of the supporting device. As an alternative, the transverse clamping pressure may be insufficient to preclude relative movement of columns 1 and 2 against the action of the weight resting upon the top end of the supporting device when clearance X is about to become zero. In this instance continued increase of the fluid pressure acting upon piston structure 45 will increase the force tending to ram part 6 into part 7 and to increase the frictional engagement between the lower slotted end of column 2 and the inner surface of column 1.

It will be apparent from the foregoing that a joint fluid motor is being provided in the structure shown in Fig. 1 for raising column 2 and for operating the brake mechanism precluding relative movement of columns 1 and 2 in a direction longitudinally thereof.

The cross-section of columns 1 and 2 may either be oval, as shown in Fig. 2, or circular, as shown in Figs. 3 and 4; if desired columns of square or rectangular cross-section may be adopted.

The wedge member 7 may be subdivided into any desired number of segments. Figs. 2 and 3 show wedge members 7 of which each is subdivided into two segments, whereas the wedge member 7 of Fig. 4 is subdivided into four segments.

As best shown in Figs. 2-4, the radially inner wedge member 6 is preferably square in cross-section. According to Figs. 2 and 3, rollers 5 are arranged on one pair of opposite surfaces of wedge member 6, whereas in the embodiment of the invention shown in Fig. 4 rollers 5 are arranged on two pairs of opposite surfaces of wedge member 6.

Figs. 2-4 clearly show the longitudinal slots 3 provided in the portion of column 2 situated on the same level as wedge members 6 and 7 to increase the flexibility, or radial expandability, of the portion of column 2 which is situated at this level.

The embodiments of the invention shown in Figs. 5, 5a, 6 and 6a comprise a lower outer column 1 and an upper inner column 2. Column 1 is provided with an orifice 10 for admission of a fluid under pressure to act upon piston structure 45 closing the lower end of the column 2. The tubular member or rod member 4 is coaxially arranged within column 2 and supports means on the lower end thereof described below more in detail.

Referring now more specifically to Figs. 5 and 5a, a cylindrical brake body 6' is supported by rod member 4 within, and in coaxial relation with respect to, radially inner column 2. This cylindrical body 6' has a system of longitudinal or vertical grooves 10 on the periphery thereof defining passages progressively increasing in depth from the top end to the bottom end of body 6'. Brake body 6' cooperates with a system of radially outer wedge elements 8 of which each is inserted into one of grooves 10. The constituent parts of wedge elements 8 are arranged equidistantly along the periphery of cylindrical grooved body 6'. Each of these elements 8 has a wedge-shaped portion progressively increasing in depth from top to bottom and each extending into one of said system of grooves 10, and each element 8 in engagement with the inner surface of the longitudinally slotted portion of column 2. A system of rollers 5 is accommodated in said system of grooves 10 in engagement with said wedge elements 8. Brake body 6' is provided with a projection 46 retaining helical spring 16 in position. The end of spring 16 remote from brake body 6' rests upon transverse plate 60 which, in turn, is supported by column 2. Thus spring 16 biases wedge element or brake body 6' to the upward position thereof wherein no brake forces are being transmitted from the radially outer surface of column 2 and the radially inner surface of column 1. The surface of column 2 juxtaposed to parts 6' and 8 is rendered expandible by provision of a system of longitudinal slots 3, in the same fashion as described in connection with Figs. 1 and 2. Rod element 4 is subdivided into a lower portion supporting brake body 6' and an upper portion supporting cap 17. The upper portion of element 4 is slidably arranged in the cover portion 49 of column 2. A toggle comprising a pair of toggle links 15 is interposed between the lower and the upper portion of rod element 4. The aforementioned toggle is hinged at 61 to the piston rod 62 of a fluid motor of the cylinder-piston type comprising cylinder 19 and piston 20. The latter is biased by means of helical spring 21 toward the left as seen in Fig. 5. As long as the aforementioned toggle is held in the position shown, the toggle provides a positive or rigid coupling between the upper portion and the lower portion of hollow rod element 4. Piston 20 may be moved from left to right by admission of fluid under pressure into orifice 63 of cylinder 19. This results in an instant collapse of the aforementioned toggle, relieving parts 6' and 8 from any pressure previously imparted to them by part 17 through the intermediary of rod element 4.

The structure of Fig. 5 differs slightly from that of Figs. 1 to 4, inclusive, in regard to the arrangement of parts adjacent the lower end of column 2. Fig. 5b shows the lower end of column 2 of the structure of Fig. 5 upon removal of parts 4, 5 and 6'. The bottom of column 2 is closed by plate 45 and an additional plate 73 supported on small brackets 75 and supporting a central core or pin 74 to center the biasing spring 16 (see Fig. 5). Small brackets 71 on column inter-slot portions 72 support wedge elements 8. The pipe line 79 is adapted for admitting air under pressure to, and venting air under pressure from, the lower portion of column 1. This portion is closed by a plug member to which numeral 78 has been applied.

Admission of fluid under pressure into orifice 10 causes column 2 to rise and to support any structure against which cap 17 abuts. The ceiling pressure upon cap 17 is transmitted downwardly through the two portions of rod element 4 and toggle 15 to brake body 6', rollers 5, wedge member 8, inner column 2 and outer column 1. This results in a brake action and precludes relative movement of columns 1 and 2 in a direction longitudinally thereof even upon draining away of fluid under pressure from under piston structure 45.

Upon admission of fluid under pressure through orifice 63 into cylinder 19 piston 20 is moved from left to right against the bias of spring 21, resulting in the collapse of the toggle 15, interposed between the two portions of rod element 4. Now spring 16 is free to push brake body 6' upwardly, thus providing instant relief from brake pressure, permitting column 2 to telescope under the action of gravity downward into column 1.

Referring now to Figs. 6, 6a and 7, numerals 1 and 2 have been applied to a pair of coaxial columns relatively movable in a direction longitudinally thereof. The lower end of column 2 is closed by a piston structure 45 and the lower end of column 1 is provided with an orifice 10 for the admission of fluid under pressure. A conical body 6" is coaxially arranged within the radially inner column 2 and has a system of longitudinal or axial grooves 11 on the periphery thereof. A system of rollers 5 is arranged in grooves 11. A radially expandible skirt 9 surrounds conical body 6". When the latter is moved downwardly against the bias of spring 16, skirt 9' expands radially and presses the juxtaposed slotted wall portion of column 2 against the inner surface of the radially outer column 1. The aforementioned skirt has a conical internal surface conforming to that of body 6" engaged by the system of rollers 5 and a cylindrical outer surface adapted to exert transverse clamping pressure upon the slotted portion of column 2. The high flexibility or radial expandability of skirt 9' is obtained by means of two systems of incisions, the first system of incisions 12 extending from the bottom edge of skirt 9' almost but not entirely to the top edge thereof, and the second intermediate system of incission 13 extending from the top edge of skirt 9' almost but not entirely to the bottom edge thereof. In other words, the solid portion of skirt 9' is of a meandering nature, resulting in the large degree of radial expandibility which is required of this part. Toggle 15 is interposed between the upper portion of rod element 4 passing through the top 49 of column 2 and supporting cap 17 and the lower portion of rod element 4 supporting the conical wedge member or ram 6". Toggle 15 is hinged at 61 to an operator 18.

A certain weight resting upon cap 17 of column 2 is transmitted through both parts 4 and toggle 15 to wedge member or ram 6". A transverse component of that force is transmitted through rollers 5 to skirt 9' and from the latter to the longitudinally slotted portion of column 2. Column 2 is then pressed against the inside of column 1, thereby the brake action precluding column 2 from sagging downwardly under the action of the weight resting upon cap 17 is established. If it is desired to render the brake ineffective, element 18 is hit with a hammer in the direction of the arrow P shown in Fig. 6, resulting in instant collapse of toggle 15, thus permitting helical spring 16 to lift the conical wedge member out of engagement with rollers 5.

Referring now more particularly to Fig. 6b, this figure shows the lower portion of column 2 upon removal of parts 4, 5 and 6' therefrom. Also some of part 9 having been removed, this exposes to view the slots 3 situated at the rear of column 2. The two sections 9' suggest the normal position of the skirt of Fig. 7. The latter is supported on column 2 by small brackets 71 on column interslot-portions 72.

It will be apparent from the foregoing that the wedge 14 shown in Fig. 1 and the toggle mechanisms 15 shown in Figs. 5 and 6 serve exactly the same purpose, i.e. to establish a positive coupling between the two portions of rod member 4 which coupling can readily be collapsed any time it is intended to render ineffective the brake for the columns 1 and 2 to permit relative movement thereof.

As mentioned above, either a liquid under pressure or a gas under pressure may be used for operating prop-type supporting devices embodying this invention. If the prop is being operated hydraulically, the fluid under pressure is allowed to escape after use thereof into a storage vessel (not shown), and may be re-used an indefinite number of times for raising the prop. Where the prop is being operated pneumatically, the air under pressure is simply dumped from the operating cylinder of the fluid motor. The orifice 10 may be used both for admission and removal of fluid under pressure. This can readily be achieved by connecting a three-way valve (not shown) to orifice 10.

While I have described my invention in several preferred forms, I am aware that various changes and modifications may be made therein without departing from the principles of the invention, the scope of which is to be determined by the appended claims.

What I claim is:

1. A prop-type supporting device comprising a substantially hollow base column defining a fluid motor cylinder, a substantially hollow top column arranged coaxially within said base column, the lower end of said top column having a plurality of slots extending in a direction longitudinally thereof to impart transverse resiliency to said lower end piston means in cooperative relation with said cylinder to move said top column in a direction longitudinally thereof relative to said base column, an abutment member arranged on the top-end of said top column having a limited freedom of motion with respect thereto in a direction longitudinally thereof, a cylindrical brake body arranged coaxially within said top column adapted to exert transverse pressure upon said lower end thereof to press the outer surface of said lower end against the inner surface of said base column, said brake body having on the outer surface thereof a system of longitudinal grooves progressively increasing depth extending from the top end to the bottom end of said brake body, system of rollers arranged in said system of grooves, a system of separate inserts each engaging one of said system of grooves and each progressively increasing in depth from the top end to the bottom end thereof, a rod member movement of said top column and said base column, a ram bar arranged within said top column in coaxial relation with respect thereto normally providing a rigid tie between said abutment member and said brake body, a collapsible element interposed in said rod member adapted to relieve said brake body from pressure exerted by said abutment member through the intermediary of said rod member, and a helical spring interposed between said piston means and said brake body biasing said brake body toward said top-end of said top column.

2. A prop-type supporting device comprising a substantially hollow base column defining a fluid motor cylinder, a substantially hollow top column arranged coaxially within said base column, the lower end of said column having a plurality of slots extending in a direction longitudinally thereof to impart transverse resiliency to said lower end, piston means in cooperative relation with said cylinder to move said top column in a direction longitudinally thereof with respect to said base column, an abutment member arranged on the top-end of said top column having a limited freedom of motion with respect thereto in a direction longitudinally thereof, a conical ram arranged coaxially within said top column having a system of longitudinal grooves on the periphery thereof, a system of rollers arranged in said system of grooves, a radially expandible skirt surrounding said conical ram, said skirt having a conical internal surface conforming to the shape of said ram engaged by said system of rollers and a cylindrical outer surface in engagement with the inner surface of said lower end of said top column, said outer surface being adapted to exert clamping pressure precluding relative movement of said base column and said top column, a rod member arranged coaxially within said top column normally providing a rigid tie between said abutment member and said conical ram, a collapsible element interposed in said rod member adapted to relieve said brake body from pressure exerted by said abutment member through the intermediary of said rod member, and spring means interposed between said piston means and said conical ram biasing said rod member toward said top-end of said top column.

3. A prop-type supporting device comprising a substantially hollow base column defining a fluid motor cylinder, a substantially hollow top column arranged coaxially within said base column, the lower end of said top column having a plurality of slots extending in a direction longitudinally thereof to impart transverse resiliency to said lower end, piston means in cooperative relation with said cylinder to move said top column in a direction longitudinally thereof with respect to said base column, an abutment member arranged on the top-end of said top column having a limited freedom of motion with respect thereto in a direction longitudinally thereof, a conical ram arranged coaxially within said top column having a system of grooves extending in a direction longitudinally thereof, a system of rollers arranged in said system of grooves, a radially expandible brake body surrounding said ram having a radially inner surface conforming to the shape of said ram in engagement with said system of rollers and a radially outer cylindrical surface in engagement with the inner surface of said lower end of said top column, said outer surface being adapted to exert braking pressure upon said lower end of said top column precluding relative movement of said top column and said base column, said brake body having a system of radial incision extending in a direction longitudinally thereof from one of the axial ends of said brake body immediately adjacent to the opposite axial end there of, immediately adjacent incisions beginning at axially opposite ends of said brake body, a rod member arranged within said top column in coaxial relation with respect thereto normally providing a rigid tie between said abutment member and said ram, a collapsible element interposed in said rod member adapted to relieve said brake body from pressure exerted by said abutment member through the intermediary of said rod member, and a helical spring interposed between said piston means and said ram biasing said rod member toward said top-end of said top column.

4. A prop-type supporting device comprising a substantially hollow base column defining a fluid motor cylinder; a substantially hollow top column arranged coaxially within said base column, the lower end of said top column having a plurality of slots extending in a direction longitudinally thereof to impart transverse resiliency to said lower end; piston means in cooperative relation with said fluid motor cylinder to move said top column in a direction longitudinally thereof relative to said base column; an abutment member arranged on top of said top column having a limited freedom of motion relative thereto in a direction longitudinally thereof; a transversely expandable brake body fixedly arranged within said top column adapted to exert transverse pressure upon said lower end thereof to press said lower end against the inner surface of said base column; relatively movable cooperating wedge means inside of said brake body to cause transverse expansion thereof, said cooperating wedge means comprising a first wedge means forming an integral part of said brake body and a second wedge means movable relative to said first wedge means in a direction longitudinally of said top column; a rod member coaxially arranged inside of said top column movable relative to said top column in a direction longitudinally thereof, said rod member normally providing a rigid tie between said abutment member and said second wedge means; a collapsible element interposed in said rod member adapted to relieve said cooperating wedge means from pressure exerted by said abutment member through the intermediary of said rod member, and spring means interposed between said piston means and said second wedge means biasing said second wedge means and said rod member toward said top end of said top column.

References Cited in the file of this patent

UNITED STATES PATENTS

| | | |
|---|---|---|
| 2,160,454 | Bucky | May 30, 1939 |
| 2,323,731 | Shetzline | July 6, 1943 |
| 2,364,715 | Horton et al. | Dec. 12, 1944 |
| 2,461,810 | Curtis | Feb. 15, 1949 |

FOREIGN PATENTS

| | | |
|---|---|---|
| 507,997 | Belgium | Jan. 15, 1952 |
| 864,538 | Germany | Jan. 26, 1953 |
| 958,578 | France | Sept. 19, 1949 |
| 972,665 | France | Aug. 30, 1950 |

UNITED STATES PATENT OFFICE
Certificate of Correction

Patent No. 2,928,643                                                    March 15, 1960

Eugen Bellmann

It is hereby certified that error appears in the above numbered patent requiring correction and that the said Letters Patent should read as corrected below.

In the drawings, Sheet 2 should appear as shown below instead of as in the patent:

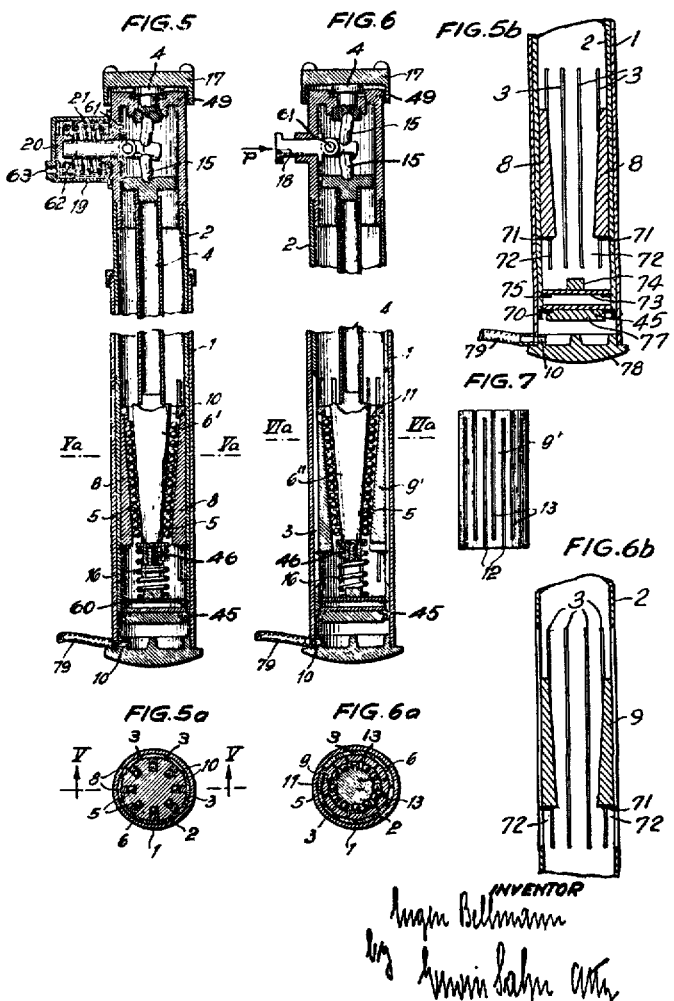

in the grant, lines 1, 2 and 3, for "Eugen Bellmann, of Hagen-Haspe, Germany," read —Eugen Bellmann, of Hagen-Haspe, Germany; Emma Elfriede Bellmann, Ruth Kronsbein, nee Bellmann, and Friedhelm Bellmann, heirs of said Eugen Bellmann, deceased,—; line 12, for "Eugen Bellmann, his heirs" read —Emma Elfriede Bellmann, Ruth Kronsbein, nee Bellmann, and Friedhelm Bellmann, their heirs—; in the heading of the printed specification, line 3, for "Eugen Bellmann, Hagen-Haspe, Germany" read —Eugen Bellmann, Hagen-Haspe, Germany; Emma Elfriede Bellmann, Ruth Kronsbein, nee Bellmann, and Friedhelm Bellmann, heirs of said Eugen Bellmann, deceased—; column 4, line 32, after "element 8" insert —is—; column 5, line 63, for "thereby" read —whereby—; column 6, lines 54 and 55, strike out "movement of said top column and said base column"; line 68, after "said", second occurrence, insert —top—; column 7, line 47, for "there of" read —thereof—.

Signed and sealed this 6th day of June 1961.

[SEAL]

Attest:
ERNEST W. SWIDER,
*Attesting Officer.*

DAVID L. LADD,
*Commissioner of Patents.*